United States Patent
Zhang et al.

(10) Patent No.: US 9,313,688 B2
(45) Date of Patent: Apr. 12, 2016

(54) BASE STATION AND COMMUNICATION RESOURCE ALLOCATION METHOD THEREOF, AND USER EQUIPMENT AND COMMUNICATION CONTROL METHOD THEREOF

(71) Applicant: FUJITSU LIMITED, Kawasaki-shi, Kanagawa (JP)

(72) Inventors: Lei Zhang, Beijing (CN); Haibo Xu, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 368 days.

(21) Appl. No.: 13/780,543

(22) Filed: Feb. 28, 2013

(65) Prior Publication Data

US 2013/0272171 A1    Oct. 17, 2013

Related U.S. Application Data

(63) Continuation of application No. PCT/CN2010/077402, filed on Sep. 28, 2010.

(51) Int. Cl.
*H04W 4/00* (2009.01)
*H04W 28/04* (2009.01)
*H04L 5/00* (2006.01)
*H04W 72/04* (2009.01)

(52) U.S. Cl.
CPC ........... *H04W 28/048* (2013.01); *H04L 5/0023* (2013.01); *H04L 5/0037* (2013.01); *H04W 72/0406* (2013.01)

(58) Field of Classification Search
None
See application file for complete search history.

(56) References Cited

U.S. PATENT DOCUMENTS

| 6,650,630 B1* | 11/2003 | Haartsen ...................... 370/345 |
| 2008/0247367 A1 | 10/2008 | Guo et al. |

(Continued)

FOREIGN PATENT DOCUMENTS

| CN | 101622802 | 1/2010 |
| CN | 101743735 A | 6/2010 |
| CN | 101772192 | 7/2010 |
| WO | WO 2007008981 A1 * | 1/2007 |

OTHER PUBLICATIONS

Intel Corporation (UK) Ltd; "Discussion on in-device coexistence scenarios and solutions"; Agenda Item: 7.6; 3GPP TSG-RAN WG2 #71; R2-104382; Madrid, Spain; Aug. 23-27, 2010.

(Continued)

*Primary Examiner* — Otis L Thompson, Jr.
(74) *Attorney, Agent, or Firm* — Myers Wolin, LLC

(57) ABSTRACT

A base station (BS) and communication resource allocation method thereof, and a user equipment (UE) and communication control method thereof are disclosed. BS communicates with UE in a time division duplex manner based on orthogonal frequency division multiplexing OFDM scheme. A period in which each subframe resides is determined, and the period is composed of at least one subframe sequence, the subframe sequence accords with the same subframe allocation mode. According to the allocation mode, each subframe in each period is determined to be signed as a first state subframe or as a second state subframe, wherein the second state is different from the first state. Each subframe of the period is signed as the first state subframe or the second state subframe according to the allocation mode. The subframes signed as the first subframes are continuous and include at least one uplink subframe and at least one downlink subframe.

24 Claims, 8 Drawing Sheets

(56) References Cited

U.S. PATENT DOCUMENTS

| | | | |
|---|---|---|---|
| 2009/0129367 A1* | 5/2009 | Bitran | 370/350 |
| 2010/0135159 A1* | 6/2010 | Chun et al. | 370/241 |
| 2010/0265856 A1* | 10/2010 | Yang | 370/281 |
| 2012/0051226 A1* | 3/2012 | Cai | 370/241 |
| 2013/0148552 A1* | 6/2013 | Zhang et al. | 370/280 |
| 2014/0036748 A1* | 2/2014 | Mukherjee et al. | 370/311 |
| 2014/0073306 A1* | 3/2014 | Shetty et al. | 455/418 |
| 2015/0098381 A1* | 4/2015 | Cucala Garc A | 370/311 |

OTHER PUBLICATIONS

International search report issued for corresponding International Patent Application No. PCT/CN2010/077402, mailed Jul. 7, 2011.

Notification of the First Office Action issued for corresponding Chinese Patent Application No. 201080069274.6 dated May 6, 2015 with an English translation.

* cited by examiner

|  | Number of subframe | | | | | | | | | |
|---|---|---|---|---|---|---|---|---|---|---|
|  | 0 | 1 | 2 | 3 | 4 | 5 | 6 | 7 | 8 | 9 |
| uplink\downlink frame configuration 0 | D | S | U | U | U | D | S | U | U | U |
|  | 0 | 1 | 2 | 3 | 4 | 5 | 6 | 7 | 8 | 9 |
| uplink\downlink frame configuration 1 | D | S | U | U | D | D | S | U | U | D |
|  | 0 | 1 | 2 | 3 | 4 | 5 | 6 | 7 | 8 | 9 |
| uplink\downlink frame configuration 2 | D | S | U | D | D | D | S | U | D | D |
|  | 0 | 1 | 2 | 3 | 4 | 5 | 6 | 7 | 8 | 9 |
| uplink\downlink frame configuration 3 | D | S | U | U | U | D | D | D | D | D |
|  | 0 | 1 | 2 | 3 | 4 | 5 | 6 | 7 | 8 | 9 |
| uplink\downlink frame configuration 4 | D | S | U | U | D | D | D | D | D | D |
|  | 0 | 1 | 2 | 3 | 4 | 5 | 6 | 7 | 8 | 9 |
| uplink\downlink frame configuration 5 | D | S | U | D | D | D | D | D | D | D |
|  | 0 | 1 | 2 | 3 | 4 | 5 | 6 | 7 | 8 | 9 |
| uplink\downlink frame configuration 6 | D | S | U | U | U | D | S | U | U | D |

Figure 4

BASE STATION AND COMMUNICATION RESOURCE ALLOCATION METHOD THEREOF, AND USER EQUIPMENT AND COMMUNICATION CONTROL METHOD THEREOF

CROSS-REFERENCE TO RELATED APPLICATIONS

This application is based on the PCT Application No. PCT/CN2010/077402, filed on Sep. 28, 2010 and entitled "BASE STATION AND COMMUNICATION RESOURCE ALLOCATION METHOD THEREOF, AND USER EQUIPMENT AND COMMUNICATION CONTROL METHOD THEREOF," the contents of which are incorporated wholly herein for reference.

FIELD

The invention relates to wireless communication techniques, and more particularly, to a base station based on the orthogonal frequency division multiplexing (OFDM) scheme and a communication resource allocation method thereof, user equipment based on the OFDM scheme and a communication control method thereof.

BACKGROUND

With the rapid popularity of user equipment (UE), such as mobile phone, the user equipment is playing a more and more important role in people's life. In addition to the communication function of UE, other functions in UE are also utilized generally, for example, UE may be used to access a wireless local network (WLAN). Further, to facilitate the communication link, data exchange and the like between UE and other devices, interfaces, such as inferred, blue tooth, and USE, etc, have gradually become standard configurations of UE. Especially, the blue tooth earphone is being applied generally. WLAN system and blue tooth system both operate at the ISM (Industry Science Medicine) frequency bands. For example, the frequency band 2400 MHz-2483.5 MHz, which is one of the internationally utilized ISM frequency bands, is also one of most often used ISM frequency bands.

In the case that the frequency band on which the communication between a UE and a base station is based is close to the frequency band on which the communication between a UE and other devices is based or is multiples of the latter frequency band, the two communications may interference with each other. For example, the advanced long term evolution (LTE) system among wireless communication systems is one of the super 3G systems (Beyond IMT-2000). According to the LTE series standards [36.101], LTE system may operate at several frequency bands. In these LTE frequency bands, some frequency bands, such as the frequency band 40, i.e. 2300 MHz-2400 MHz for deploying LTE time division duplex (TDD) system and the frequency band 7, i.e. uplink 2500 MHz-2570 MHz and downlink 2620 MHz-2670 MHz, for deploying LTE frequency division duplex (FDD) system, are adjacent to the ISM frequency bands. Therefore, if a LTE UE works at the above frequency bands while the WLAN system or blue tooth system on the UE is activated, the LTE system and the ISM system (WLAN system, blue tooth system or the like) of the UE that work at the adjacent frequency bands interfere with each other due to the leakage of the adjacent frequency bands, or even face a communication failure due to high error rate.

A conventional method of solving the above issue is to utilize transmission filters of higher performance in both the transmitting end, communicating with the base station, on the UE (e.g. The LTE system on the UE) and the transmitting end, communicating with other devices, on the UE (e.g. The ISM system on the UE), so as to reduce the leakage of the adjacent frequency bands as much as possible. The disadvantage of such method is that the cost of the UE may be increased significantly.

SUMMARY

An embodiment of the invention provides a base station, for communicating with a user equipment in a time division duplex manner based on an orthogonal frequency division multiplexing scheme, wherein physical transmission resources for the communication between the base station and the user equipment are divided into a plurality of consecutive frames in the time domain, each of the frames includes a plurality of subframes, and the base station includes: a cycle determination device which determines a cycle to which each subframe belongs, wherein the cycle consists of at least one subframe sequence, each of which complies with the same subframe distribution pattern; a judgment device which determines whether each subframe of each cycle is marked as a first state or a second state different from the first state according to an allocation pattern, wherein the allocation pattern marks each subframe of the cycle as the first state or the second state, the subframes marked as the first state are consecutive, and include at least one uplink subframe and at least one downlink subframe; and a communication control device which, in case of determining that the subframe is marked as the first state, enables the base station to communicate with the user equipment over the subframe according to a predetermined control mapping relation associated with the allocation pattern, and in case of determining that the subframe is marked as the second state, disables the base station from performing the communication only relating to the user equipment over the subframe.

An embodiment of the invention provides a user equipment for communicating with a base station in a time division duplex manner based on an orthogonal frequency division multiplexing scheme, wherein physical transmission resources for the communication between the base station and the user equipment are divided into a plurality of consecutive frames in the time domain, each of the frames includes a plurality of subframes, and the user equipment includes a first transceiver, a second transceiver, and a control device. The first transceiver may communicate with the base station. The second transceiver may perform another communication with at least one peripheral device based on another wireless communication scheme. The control device may control the first transceiver and the second transceiver according to an allocation pattern, wherein respective subframes are divided into cycles consisting of at least one subframe sequence, each of which complies with the same subframe distribution pattern, the allocation pattern marks each subframe of the cycles as a first state or a second state different from the first state, and the subframes marked as the first state are consecutive and include at least one uplink subframe and at least one downlink subframe, the control device controls the first transceiver to communicate with the base station over each subframe according to a predetermined control mapping relation associated with the allocation pattern in case of determining that the subframe is marked as the first state, and controls the second transceiver to perform the other communication in time corresponding to each subframe in case of determining that the subframe is marked as the second state and is not used by the user equipment for receiving system information.

An embodiment of the invention provides a method of communication resource allocation in a base station for communicating with user equipment in a time division duplex manner based on an orthogonal frequency division multiplexing scheme. Physical transmission resources for the communication between the base station and the user equipment are divided into a plurality of consecutive frames in the time domain, each of the frames includes a plurality of subframes. The method includes: determining a cycle to which each subframe belongs, wherein the cycle consists of at least one subframe sequence, each of which complies with the same subframe distribution pattern; determining whether each subframe of each cycle is marked as a first state or a second state different from the first state according to an allocation pattern, wherein the allocation pattern marks each subframe of the cycle as the first state or the second state, the subframes marked as the first state are consecutive, and include at least one uplink subframe and at least one downlink subframe; and in case of determining that the subframe is marked as the first state, enabling the base station to communicate with the user equipment over the subframe according to a predetermined control mapping relation associated with the allocation pattern, and in case of determining that the subframe is marked as the second state, disabling the base station from performing the communication only relating to the user equipment over the subframe.

An embodiment of the invention provides a method of communication control in user equipment for communicating with a base station in a time division duplex manner based on an orthogonal frequency division multiplexing scheme. Physical transmission resources for the communication with the base station are divided into a plurality of consecutive frames in the time domain, each of the frames includes a plurality of subframes. The method includes: controlling a first transceiver for the communication with the base station and a second transceiver for another communication with at least one peripheral device based on another wireless communication scheme, according to an allocation pattern, wherein respective subframes are divided into cycles consisting of at least one subframe sequence, each of which complies with the same subframe distribution pattern, the allocation pattern marks each subframe of the cycles as a first state or a second state different from the first state, and the subframes marked as the first state are consecutive and include at least one uplink subframe and at least one downlink subframe, wherein the control comprises controlling the first transceiver to communicate with the base station over each subframe according to a predetermined control mapping relation associated with the allocation pattern in case of determining that the subframe is marked as the first state, and controlling the second transceiver to perform the other communication in time corresponding to each subframe in case of determining that the subframe is marked as the second state and is not used by the user equipment for receiving system information.

BRIEF DESCRIPTION OF DRAWINGS

The above object, features and advantages of the invention will be better understood from the following description of embodiments of the invention with reference to the drawings. In the drawings, the same or corresponding technical features or parts are represented by the same or corresponding reference signs.

FIG. 4 shows the uplink\downlink frame configurations 0 to 6 in LTE TDD scheme.

DETAILED DESCRIPTION

Figure 1:
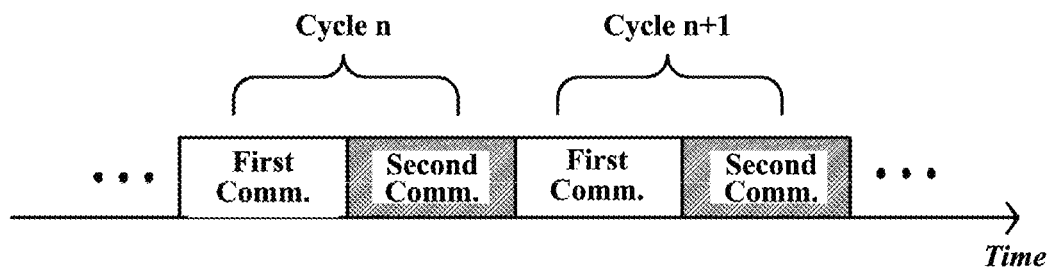
FIG. 1 is a schematic diagram showing that the first communication between UE and the base station and the second communication between the UE and other device are performed in a time division manner.

Some embodiments of the invention are described below with reference to the drawings. It is to be noted that, for the sake of conciseness, the representations and description of the parts and processes known to those skilled in the art are omitted in the drawings and the detailed description.

In a UE, two types of communication can be performed at the same time. One type is the communication between the UE and the base station (to simply the description, hereinafter referred to as the first communication), and the other type is the communication between the UE and other devices (for example, the blue tooth earphone) (to simply the description, hereinafter referred to as the second communication). The frequency bands on which the first and second communications are based are close to each other. In such cases, one of the first and second communications may interfere with the other communication due to the leakage of the adjacent channels. Or the first and second communications may interfere with each other. The inventor recognized that the first and second communications may be performed in a time division manner to avoid such interference. FIG. 1 is a schematic diagram showing that the first communication and the second communication are performed in a time division manner. As shown in FIG. 1, in each cycle in time domain, the first communication and the second communication are performed alternately. The base station may configure the subframe resources used by the first communication, where the first communication is performed on the subframes corresponding to the time periods for the first communication, and the second communication is performed on the subframes corresponding to the time periods for the second communication. In UE, communication control may be performed, where the second communication is performed on the time period corresponding to the second communication after the first communication is performed on the time period corresponding to the first communication according to the channel resource allocation performed by the base station.

Figure 2:
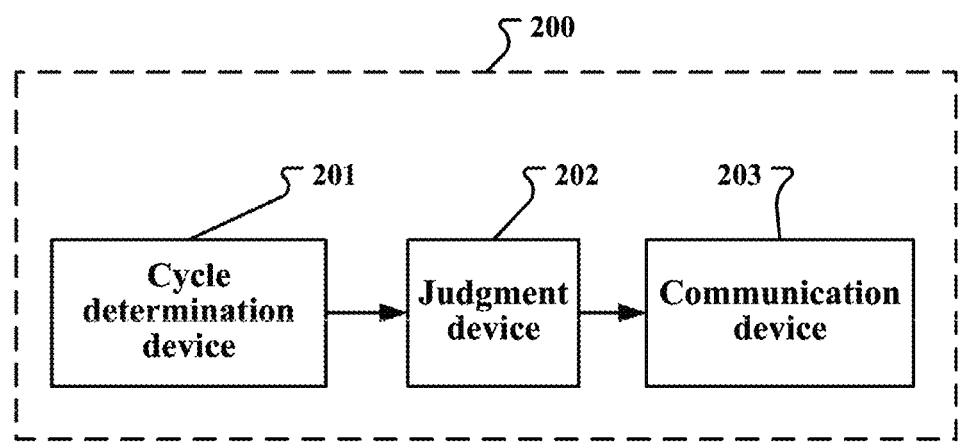
FIG. 2 is a schematic block diagram showing the structure of a base station according to an embodiment of the invention.

FIG. 2 is a schematic block diagram showing the structure of the base station 200 according to an embodiment of the invention. The base station 200 may communicate with the UE based on the OFDM scheme in a time division duplex manner, the physical transmission resource used for the communication between the base station and the UE may be divided in time domain into a plurality of consecutive frames, each frame includes a plurality of subframes.

As shown in FIG. 2, the base station 200 includes a cycle determination device 201, a judgment device 202 and a communication control device 203.

The cycle determination device 201 may determine the cycle to which each subframe belongs. The cycle is formed of at least one subframe sequence. Each subframe sequence complies with the same subframe distribution mode. Therefore, determining the cycle to which a subframe belongs may involve determining the cycle to which a subframe belongs and the position of the subframe in the cycle. Each frame contains different types of subframes, such as the uplink subframe and the downlink subframe. In the consecutive subframe stream, there exists a subframe distribution mode that is occurred repeatedly. The subframe distribution mode indicates the positions and types of the subframes in a sequence of a fixed number of consecutive subframes. That is, a fixed number of consecutive subframes starting from a position in the subframe stream comply with a type of subframe distribution mode, and the following fixed number of consecutive subframes also complies with the same subframe distribution mode. Further, the subframe distribution mode should be the minimum, that is, the subframe distribution mode cannot be obtained by repeating a shorter subframe distribution mode.

For example, according to the LTE TDD scheme, a frame may comply with one of the 7 uplink\downlink frame configurations 0 to 6. FIG. 4 shows the uplink\downlink frame configurations 0 to 6 in the LTE TDD scheme. As shown in FIG. 4, each frame includes 10 subframes, i.e. the subframe 0 to the subframe 9. The subframe marked with a symbol "D" is a downlink subframe, the subframe marked with a symbol "U" is an uplink subframe, and the subframe marked with a symbol "S" is a subframe containing a switching point. As can be seen, in the 7 configurations, the configurations 0, 1 and 2 may have the subframe distribution mode of 5 subframes (i.e. the length); the configurations 3, 4, 5 and 6 may have the subframe distribution mode of length 10. As can be understood, in each cycle, the subframes D, the subframes U and the subframes S (also considered as the downlink subframe) have the same distribution. The length of a cycle is the integer multiples of the length of the subframe distribution mode.

Figure 5:
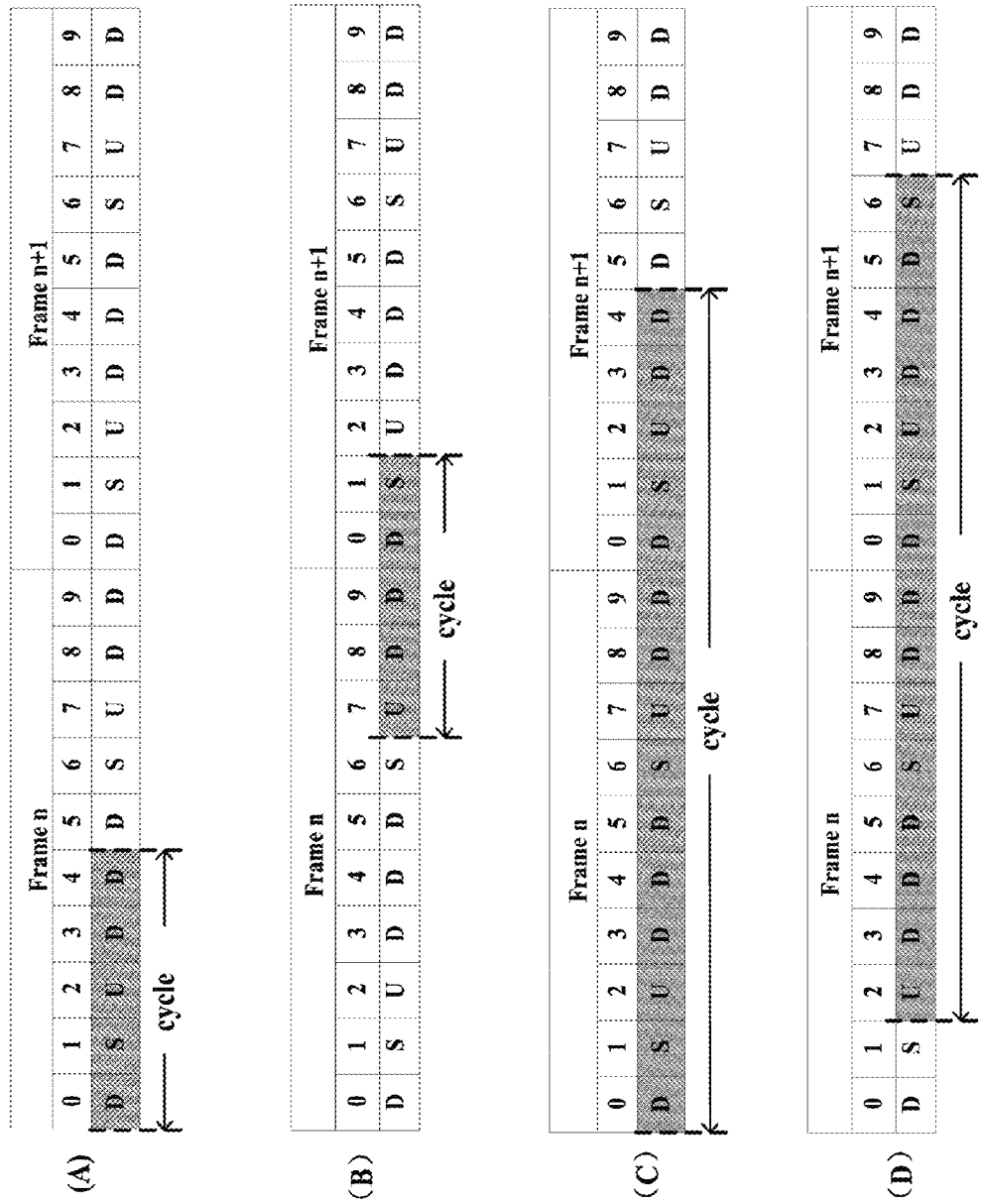
FIGS. 5(A) to 5(D) respectively show examples of cycles in uplink\downlink frame configuration 2.

FIGS. 5(A) to 5(D) respectively show the examples under the uplink\downlink frame configuration 2. As shown in FIG. 5(A) and FIG. 5(B), the length of the subframe distribution mode is 5, and the length of the cycle is also 5. As shown in FIG. 5(C) and FIG. 5(D), the length of the subframe distribution mode is 5, and the length of the cycle is 15.

Returning to FIG. 2, the judgment device 202 may determine whether each subframe in each cycle is a subframe marked as the first state or marked as the second state different from the first state according to the allocation mode. The allocation mode marks each subframe in a cycle as the first state or the second state. The subframes marked as the first state are consecutive, and include at least one uplink subframe and at least one downlink subframe.

Figure 6:
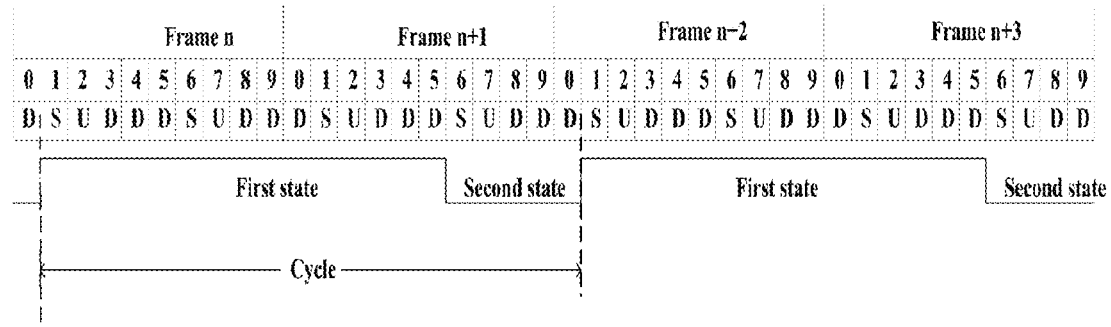
FIG. 6 shows an example of an allocation mode in uplink\downlink frame configuration 2.

FIG. 6 shows an example of the allocation mode under the uplink\downlink frame configuration 2. In the example shown in FIG. 6, the subframe distribution mode is subframe S, subframe U, subframe D, subframe D, and subframe D. A cycle contains in order the subframe 1 to the subframe 9 in a frame n, the subframe 0 to the subframe 9 in the next frame n+1, and the subframe 0 in the next frame n+2, i.e. 20 subframes in total. In each cycle, the first 15 subframes are marked as the first state, and the following 5 subframes are marked as the second state.

Figure 7:
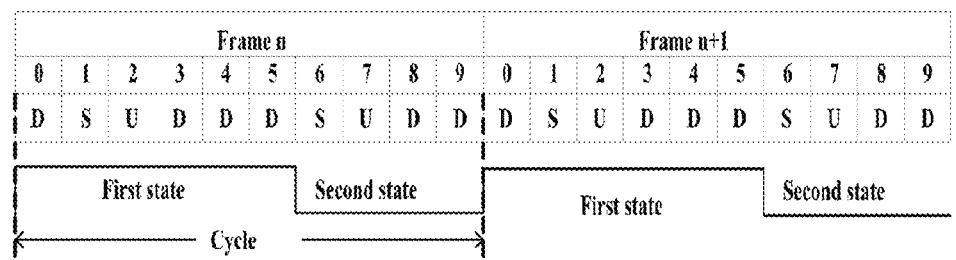
FIG. 7 shows an example of an allocation mode in uplink\downlink frame configuration 2.

FIG. 7 shows an example of the allocation mode under the uplink\downlink frame configuration 2. In the example of FIG. 7, the subframe distribution mode is subframe D, subframe S, subframe U, subframe D, and subframe D. Each cycle contains the subframe 0 to the subframe 9 in a frame, i.e. 10 subframes in total. In each cycle, the first 6 subframes are marked as the first state, and the following 4 subframes are marked as the second state.

Figure 8:
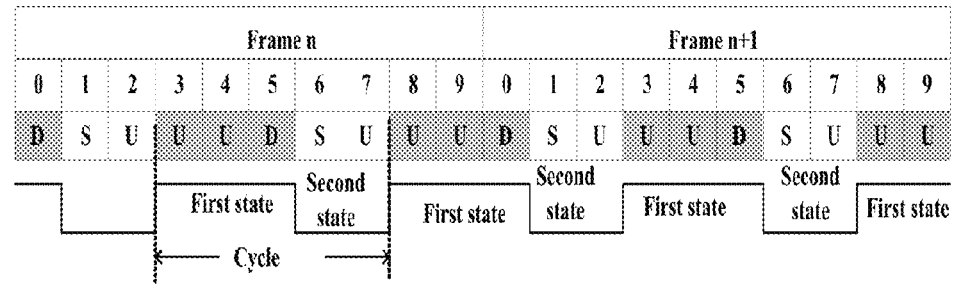
FIG. 8 shows an example of an allocation mode in uplink\downlink frame configuration 2.

FIG. 8 shows an example of the allocation mode under the uplink\downlink frame configuration 2. In the example shown in FIG. 8, the subframe distribution mode is subframe U, subframe U, subframe D, subframe S, and subframe U. For example, a cycle may contain in order the subframe 3 to the subframe 7 in a frame n, and the next cycle may contain in order the subframe 8 to the subframe 9 in the frame n, and the subframe 0 to the subframe 2 in the next frame n+1, and so on. Each cycle contains 5 subframes. In each cycle, the first 3 subframes are marked as the first state, and the following 2 subframes are marked as the second state.

Returning to FIG. 2, the communication control device 203 may allow, in the case of determining that the subframes are marked as the first state, the base station and the UE to perform the first communication on the subframes according to the predetermined control mapping relation related with the allocation mode. The communication control device 203 may forbid, in the case of determining that the subframes are marked as the second state, the base station to perform the communication relating only to the UE on the subframes. The communication relating only to the UE does not contain broadcasting of the system information (for example, the system information in the LTE TDD system) from the base station to all UEs. The communication control device 203 may realize the allowing and forbidding by resource allocation.

The first communication may include the transmission and retransmission of uplink, downlink data, various control signaling interaction of physical layer or higher layer between the base station and the UE, and the like. As detailed below, during the first communication, the second communication is forbidden, and vice visa.

To maintain the normal operation of the time division duplex mode based on OFDM scheme, in addition to the uplink and downlink data transmission, the UE and the base station also perform exchanging of various uplink and downlink control information. In the case of the LTE TDD system, the control information may be for example HARQ information, CQI information, the configuration information of uplink data transmission from the base station to the UE, the indication information of receiving the downlink data by the base station from the UE, and the like.

Here, the corresponding relation of the control information with the target subframe corresponding to the control information is called as the control mapping relation. For example, the control mapping relation may include the following information: for data transmission on a downlink\uplink subframe, the uplink transmission of the control information related thereto should be performed in specified uplink\downlink subframe. Since in each cycle the subframes marked as the first state include at least one uplink subframe and at least one downlink subframe, appropriate control mapping relation may be specified for the particular uplink\downlink frame configuration and allocation mode. That is, for an uplink subframe marked as the first state, the downlink subframe which has the control mapping relation with the uplink subframe is specified in the following downlink subframes, i.e. the downlink subframe for transmitting all the control information related to the uplink subframe. Likewise, for a downlink subframe marked as the first state, the uplink subframe which has the control mapping relation with the downlink subframe is specified in the following uplink subframes, i.e. the uplink subframe for transmitting all the control information related to the downlink subframe.

In a further embodiment (hereinafter referred as example 1) of the base station described with reference to FIG. 2, the base station may be based on the LTE TDD scheme. The number of the subframes of a cycle may be larger than the number of the subframes of a frame. The number of the subframes marked as the first state in the cycle is the integer multiples of the number of the subframes in the subframe sequence, i.e. the subframe distribution mode. Preferably, the allocation mode may be set such that, in every 4 frames the subframes marked as the first state contain at least 1 subframe 0, and in every 8 frames, the subframes marked as the first state contain at least 1 subframe 5 located in an even frame.

In a further embodiment (hereinafter referred as example 2) of the base station described with reference to FIG. 2, the base station may be based on the LTE TDD scheme. The number of the subframes of a cycle may be equal to the number of the subframes of a frame. Preferably, the subframes marked as the first state in a cycle contain at least all the subframes from the subframe 0 to the subframe 5 or from the subframe 5 to the subframe 0.

In a further embodiment (hereinafter referred as example 3) of the base station described with reference to FIG. 2, the base station may be based on the LTE TDD scheme. Each frame complies with the provision of the uplink\downlink frame structure configurations 0, 1 or 2. The number of the subframes of a cycle may be equal to 5. Preferably, the subframes marked as the first state in a cycle must contain the subframe 5.

In case of the example 1, for some allocation modes, the number of all the consecutive subframes marked as the second state between two subframes marked as the first state is larger. The corresponding time of these consecutive subframes forms the discontinuous time delay in the first communication. In a particular LTE TDD scheme system, depending upon the requirements of the LTE services or the needs of the operators, the time interval between 2 subframes having the control mapping relation may be specified, that is, the allowable upper limit of the time delay of the control mapping relation may be specified. In a further embodiment, according to the used allocation mode, the discontinuous time delay is no larger than the allowable upper limit of the time delay of the control mapping relation, the predetermined control mapping relation may include the control mapping relation between the subframe marked as the first state in the preceding cycle among the adjacent cycles and the subframe marked as the first state in the subsequent cycle. Regarding such a case, FIGS. 9(A) and 9(B) respectively show the example of the control mapping relation according to related art and the control mapping relation according to the embodiment of the invention.

Figure 9:
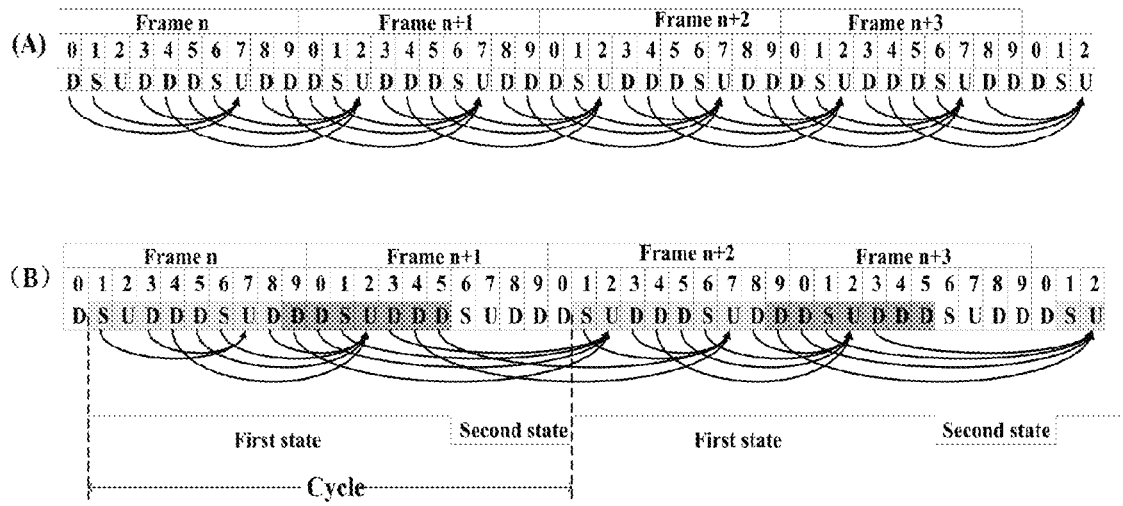
FIGS. 9(A) to 9(B) are schematic diagrams respectively showing examples of control mapping relations according to the embodiments of the invention and examples of control mapping relations according to related art.

In the example of FIG. 9(A), the uplink\downlink frame configuration 2 is used. The arc with arrowhead shown in FIG. 9(A) connects the 2 subframes having the control mapping relation, where one end without the arrowhead of the arc connects to the downlink subframe for transmitting downlink data, and the other end with the arrowhead of the arc connects to the uplink subframe for returning corresponding ACK\NACK.

In the example of FIG. 9(B), the configuration described above with reference to FIG. 6 is used. The arc with arrowhead connects the 2 subframes having the control mapping relation, where one end without the arrowhead of the arc connects to the subframe for transmitting downlink data, and the other end with the arrowhead of the arc connects to the uplink subframe for returning corresponding ACK\NACK. As can be seen, the corresponding relation between the downlink data of the shallow-shadowed subframe and the uplink subframe for transmitting the ACK/NACK is the same with that shown in FIG. 9(A). Since the subframe is located at the edge of the consecutive subframe part marked as the first state, the corresponding relation between the downlink data of the dark-shadowed subframe and the uplink subframe for transmitting the ACK/NACK is changed compared with that shown in FIG. 9(A). For example, in FIG. 9(B) the downlink subframe corresponding to the subframe 1 of the frame n is the subframe 7 of the frame n+1 in FIG. 9(A), however, since the subframe 7 of the frame n+1 is marked as the second state, the downlink subframe corresponding to the subframe 1 of the frame n+1 is adjusted as the subframe 2 of the frame n+2. The so-called "discontinuous time delay" is for example the corresponding time from the subframe 6 of the frame n+1 to the subframe 0 of the frame n+2.

Figure 10:
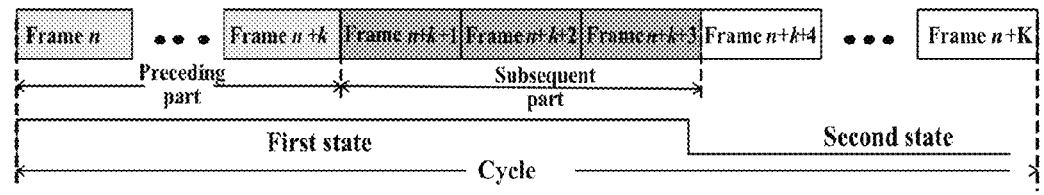
FIG. 10 is a schematic diagram showing an example in which the subframe marked as the first state is divided into two consecutive parts.

In the case of the example 1, based on a further embodiment, according to the used allocation mode, the discontinuous time delay is larger than the allowable upper limit of the time delay of the control mapping relation. In the embodiment, in the allocation mode the subframes marked as the first state are divided into two consecutive parts. Accordingly, the communication control device 203 performs control such that the base station, in the subsequent part of the two consecutive parts, performs with the UE only the transmission that meets the control mapping relation involved in the transmission in the preceding part of the two consecutive parts. FIG. 10 is a schematic diagram showing the case of dividing the subframes marked as the first state into two consecutive parts.

As shown in FIG. 10, the consecutive subframe part marked as the first state in a cycle includes the subframes of the frame n to the frame n+k+3. The subframe of the frame n to the frame n+k form the preceding part, and the subframes of the frame n+k+1 to the frame n+k+3 form the subsequent part (also called as the buffer period). In the preceding part, the base station communicates normally with the UE. In the subsequent part, the base station does not perform new downlink transmission to the UE and does not schedule the UE to perform new uplink transmission, but performs the data transmission and signaling transmission that have not been finished correctly, i.e. the transmission that meets the control mapping relation involved in the preceding part transmission.

In an example of 3 times of retransmission, the buffer period needed for the uplink\downlink frame configurations 1~5 are about 30 ms. The buffer period needed for the uplink\downlink frame configuration 0 is about 30~39 ms. The buffer period needed for the uplink\downlink frame configuration 6 is about 33 ms~42 ms.

It is to be noted that, though in some examples the invention is described with reference to the control mapping relation between the preceding downlink subframe and the following uplink subframe, those skilled will understand that the control mapping relation between the preceding uplink subframe and the following downlink subframe can be determined similarly.

In the case of the example 2 or 3, in a further embodiment, according to the predetermined control mapping relation, among the adjacent cycles, all subframes that have the control mapping relation with the subframes marked as the first state in the preceding cycle are contained in the subframes marked as the first state of the subsequent cycle. It is assumed that in each cycle the subframes marked as the first state contain n subframes, where the number of the uplink subframes is a and the number of the downlink subframes is b.

In the case of a>b, the first b−1 downlink subframes marked as the first state in the subsequent cycle respectively have control mapping relations with the $\lceil a/b \rceil$ uplink subframes marked as the first state in the preceding cycle, the last downlink subframe marked as the first state in the subsequent cycle has a control mapping relation with the $a-\lceil a/b \rceil \cdot (b-1)$ uplink subframes marked as the first state in the preceding cycle, where $\lceil a/b \rceil$ is larger than or equals to the minimum integer of the quotient obtained by dividing a by b. The order of the above downlink subframes is the same as the order of the sets of uplink subframes having control mapping relation to the downlink subframes.

In the case of a>b, the first b uplink subframes marked as the first state in the subsequent cycle respectively have control mapping relations with a downlink subframe marked as the first state in the preceding cycle. The order of the above uplink subframes is the same as the order of the downlink subframes having control mapping relation to the uplink subframes.

In the case of a=b, each downlink subframe marked as the first state in the subsequent cycle has control mapping relation with an uplink subframe marked as the first state in the preceding cycle, and each uplink subframe marked as the first state in the subsequent cycle has control mapping relation with a down link subframe marked as the first state in the preceding cycle. The order of the above uplink subframes is the same as the order of the downlink subframes having control mapping relation to the uplink subframes.

In the case of a<b, the first a−1 uplink subframes marked as the first state in the subsequent cycle respectively have control mapping relations with the $\lceil b/a \rceil$ downlink subframes marked as the first state in the preceding cycle, the last uplink subframe marked as the first state in the subsequent cycle has the control mapping relation with the $b-\lceil b/a \rceil \cdot (a-1)$ downlink subframes marked as the first state in the preceding cycle, wherein $\lceil b/a \rceil$ is the minimum integer of the quotient obtained by dividing a by b. The order of the above uplink subframes is the same as the order of the downlink subframes having control mapping relation to the uplink subframes.

In the case of a<b, the first a downlink subframes marked as the first state in the subsequent cycle each have control mapping relation with an uplink subframe marked as the first state in the preceding cycle. The order of the above downlink subframes is the same as the order of the uplink subframes having control mapping relation to the downlink subframes.

Figure 11:
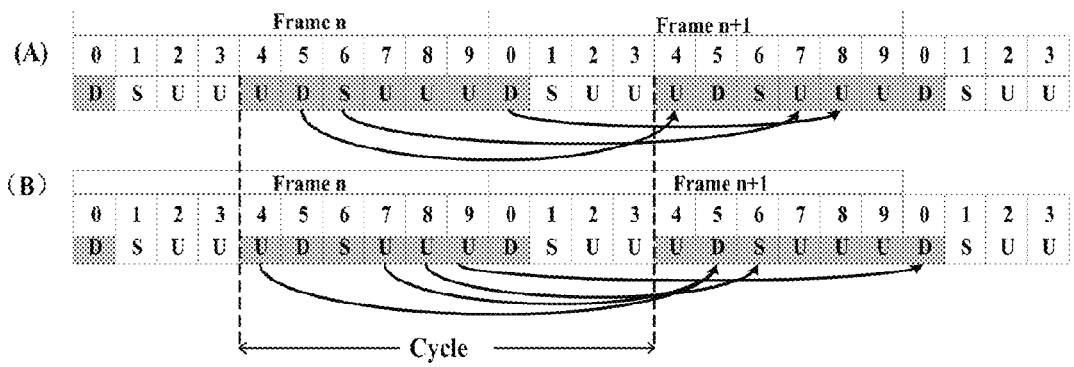
FIGS. 11(A) and 11(B) are schematic diagrams respectively showing examples of the control mapping relation between a preceding downlink subframe and a subsequent uplink subframe and the control mapping relation between a preceding uplink subframe and a subsequent downlink subframe.

For further embodiments of the above case 2, FIGS. 11(A) and 11(B) are schematic diagrams respectively showing examples of the control mapping relation between a preceding downlink subframe and a subsequent uplink subframe and the control mapping relation between a preceding uplink subframe and a subsequent downlink subframe.

In the examples of FIGS. 11(A) and 11(B), the uplink\downlink frame configuration 0 is used, and the length of a cycle is 10 subframes. The cycle starts from the subframe 4 of each frame and ends at the subframe 0 of the next frame. The number of the subframes marked as the first state (indicated by the shadowed blocks as shown in the figures) in a cycle is 7, and the number of the subframes marked as the second state (indicated by the white blocks as shown in figures) in a cycle is 3. In the subframes marked as the first state in a cycle, the number of downlink subframes is 3, and the number of the uplink subframes is 4. An arc with arrowhead in FIG. 11(A) indicates the control mapping relations between the downlink subframe marked as the first state in the current cycle and the uplink subframe marked as the first state in the next cycle. An arc with arrowhead in FIG. 11(B) indicates the control mapping relations between the uplink subframe marked as the first state in the current cycle and the downlink subframe marked as the first state in the next cycle.

Figure 12:
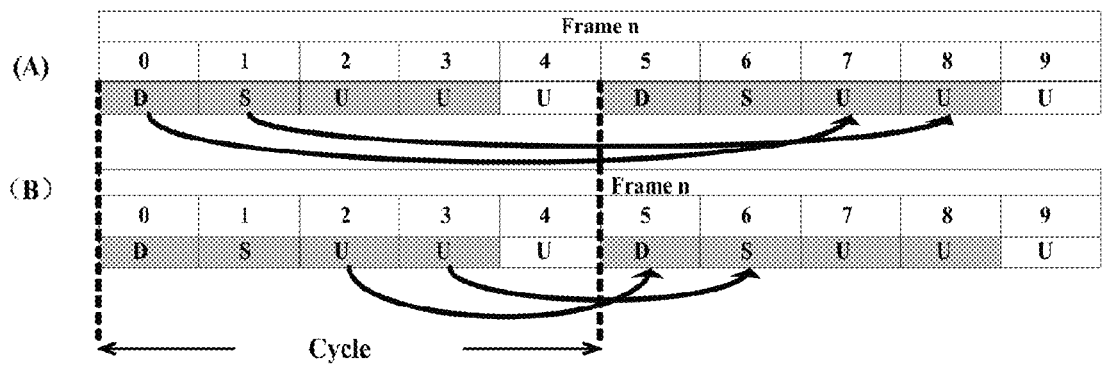
FIGS. 12(A) and 12(B) are schematic diagrams respectively showing examples of the control mapping relation between a preceding downlink subframe and a subsequent uplink subframe and the control mapping relation between a preceding uplink subframe and a subsequent downlink subframe.

For further embodiments of the above case 3, FIGS. 12(A) and 12(B) are schematic diagrams respectively showing examples of the control mapping relation between a preceding downlink subframe and a subsequent uplink subframe and the control mapping relation between a preceding uplink subframe and a subsequent downlink subframe.

In the examples of FIGS. 12(A) and 12(B), the uplink\downlink frame configuration 0 is used and the length of a cycle is 5 subframes. The cycle starts from the subframe 0 or 5 of each frame and ends at the subframe 4 or 9 of the current frame. The first 4 subframes are marked as the first state (indicated by the shadowed blocks as shown in the figures) in a cycle, and the last subframe is marked as the second state (indicated by the white block as shown in figures) in a cycle. In the subframes marked as the first state in a cycle, the number of downlink subframes is 2, and the number of the uplink subframes is 2. FIG. 12(A) shows the control mapping relation between the downlink subframes marked as the first state in the current cycle and the uplink subframes marked as the first state in the next cycle. FIG. 12(B) shows the control mapping relation between the uplink subframes marked as the first state in the current cycle and the downlink subframes marked as the first state in the next cycle.

Figure 13:
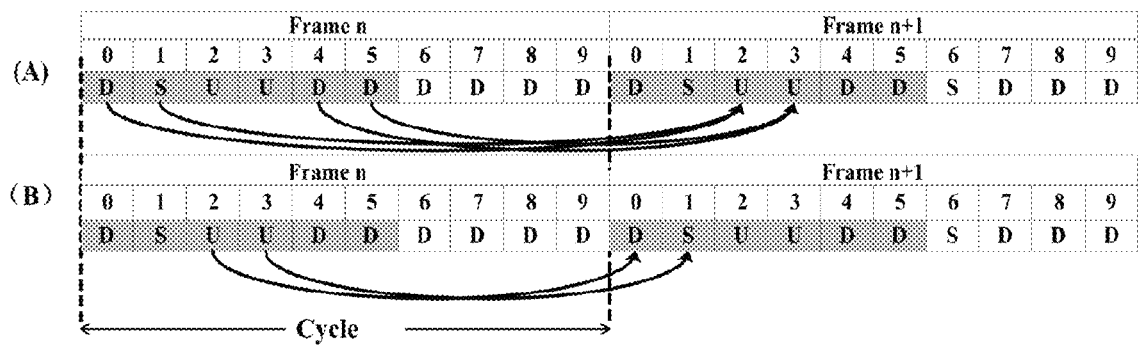
FIGS. 13(A) and 13(B) are schematic diagrams respectively showing examples of the control mapping relation between a preceding downlink subframe and a subsequent uplink subframe and the control mapping relation between a preceding uplink subframe and a subsequent downlink subframe.

For further embodiments of the above case 3, FIGS. 13(A) and 13(B) are schematic diagrams respectively showing examples of the control mapping relation between a preceding downlink subframe and a subsequent uplink subframe and the control mapping relation between a preceding uplink subframe and a subsequent downlink subframe.

In the examples of FIGS. 13(A) and 13(B), the uplink\downlink frame configuration 4 is used, and the length of a cycle is 10 subframes. The cycle starts from the subframe 0 of each frame and ends at the subframe 9 of the current frame. The number of the subframes marked as the first state (indicated by the shadowed blocks as shown in the figures) in a cycle is 6, and the number of the subframes marked as the second state (indicated by the white blocks as shown in figures) in a cycle is 4. In the subframes marked as the first state in a cycle, the number of downlink subframes is 4, and the number of the uplink subframes is 2. An arc with arrowhead in FIG. 13(A) indicates the control mapping relations between the downlink subframe marked as the first state in the current cycle and the uplink subframe marked as the first state in the next cycle. An arc with arrowhead in FIG. 13(B) indicates the control mapping relations between the uplink subframe marked as the first state in the current cycle and the downlink subframe marked as the first state in the next cycle.

In the LTE TDD system, the base station needs to broadcast system information to the UEs. The system information includes the master information block (MIB) and the system information block (SIB). MIB is generally broadcast in the subframe 0, and SIB is broadcast in the subframe 5. According to the system resource allocation, the system information may be borne on the subframe marked as the first state (for example the subframe 0 and the subframe 5), or the subframe marked as the second state may be used to purely transmit the system information.

Figure 3:
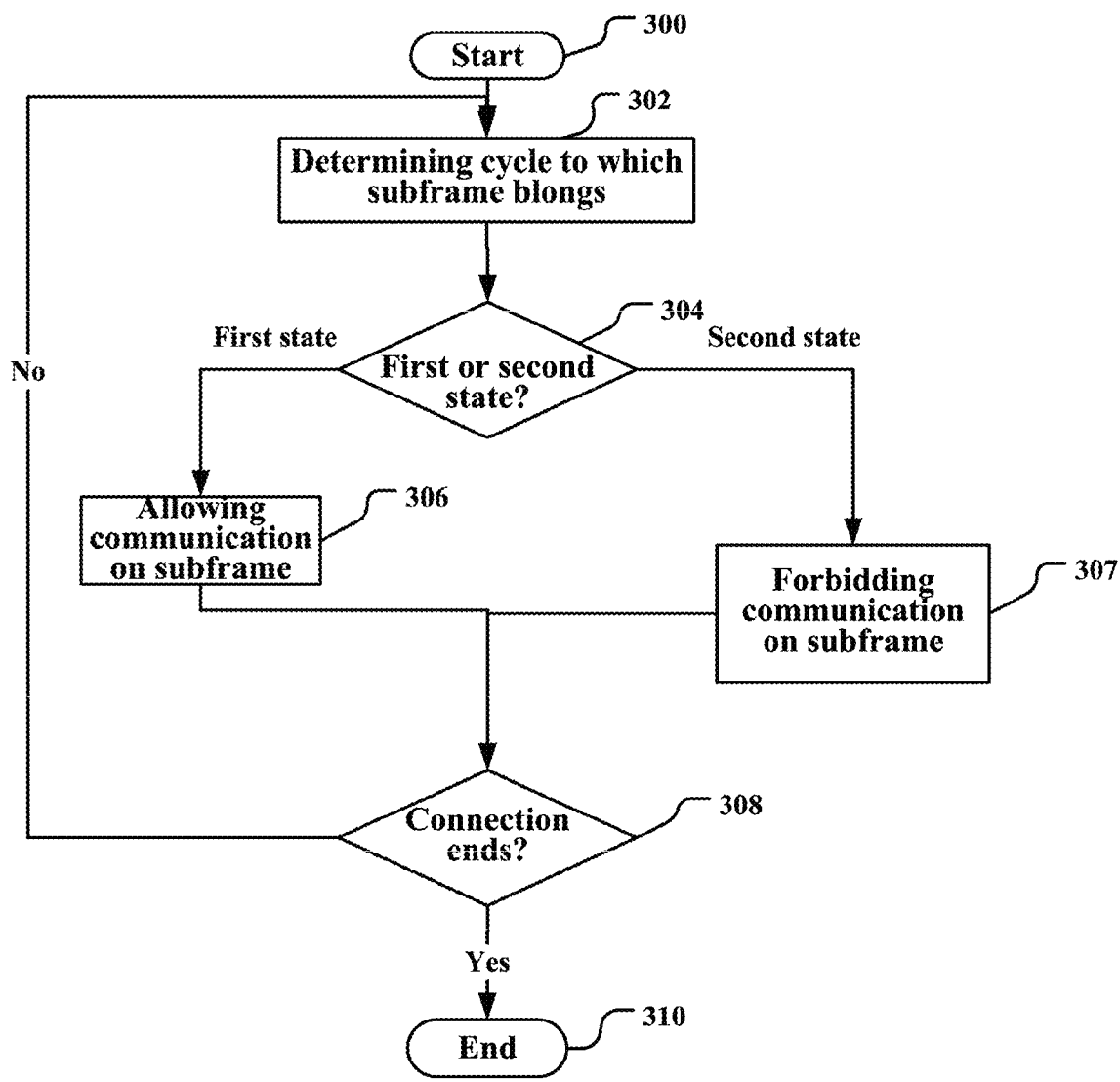
FIG. 3 is a schematic flow chart showing the process of a method of allocating communication resources in a base station according to an embodiment of the invention.

FIG. 3 is a schematic flow chart showing the process of a method of allocating communication resources in the base station according to an embodiment of the invention. The base station may communicate with the UE based on the OFDM scheme in the time division duplex manner. The physical transmission resource used for communication of the base station with the UE may be divided in time domain into a plurality of consecutive frames, each frame includes a plurality of subframes.

As shown in FIG. 3, the method starts at step 300. In step 302, the cycle to which each subframe belongs is determined. The cycle is formed of at least one subframe sequence. Each subframe sequence complies with the same subframe distribution mode. Therefore, determining the cycle to which each subframe belongs may involve determining the cycle of the subframe and the position of the subframe in the cycle. Each frame contains various types of subframes, for example, the uplink subframe and the downlink subframe. In consecutive subframe stream, there exists the subframe distribution mode that occurs repeatedly. The subframe distribution mode indicates the positions and types of the subframes in a sequence of fixed number of consecutive subframes. That is, in the subframe stream a fixed number of the consecutive subframes starting from a position comply with a subframe distribution mode, and the following fixed number of the consecutive subframes also meets the same subframe distribution mode. Further, the subframe distribution mode should be the minimum, i.e. the subframe distribution mode can not be obtained by repeating a shorter subframe distribution mode.

In step 304, according to the allocation mode (for example, the allocation mode described with reference to FIG. 6, 7, or 8), it is determined whether in each cycle each subframe is a subframe marked as the first state or the second state different from the first state. The allocation mode marks each subframe in the cycle as the first state or the second state. The subframes marked as the first state are consecutive, and include at least one uplink subframe and at least one downlink subframe. If it is determined in step 304 that the subframe is marked as the first state, then in step 306 the first communication between the base station and the UE is allowed to be performed on the subframe according to the predetermined control mapping relation related with the allocation mode. Next the processing proceeds to step 308. If it is determined in step 304 that the subframe is marked as the second state, then in step 307 the base station is forbidden to perform the communication relating only to the UE on this subframe. The communication relating only to the UE does not contain the broadcasting of system information (for example the system information of the LTE TDD system) from the base station to all the UEs. Such allowing and forbidding may be realized by resource allocation. Next the processing proceeds to step 308.

In step 308, it is determined whether the connection of the base station with the UE is ended. If not, the processing returns to step 302 for further process, and otherwise, the method terminates in step 310. With the elapse of time, the subframes to be processed also change.

In a further embodiment described with reference to FIG. 3 (also referred to as example 4), the base station may be based on the LTE TDD scheme. The number of the subframes in a cycle may be larger than the number of subframes in a frame. The number of the subframes marked as the first state in a cycle is the integer multiples of the number of subframes of the subframe distribution mode, i.e. the subframe sequence. Preferably, the allocation mode may be set such that in every 4 frames, the subframes marked as the first state contain at least one subframe 0, and in every 8 frames, the subframes marked as the first state contain at least one subframe 5 in the even frames.

In a further embodiment described with reference to FIG. 3 (also referred to as example 5), the base station may be based on the LTE TDD scheme. The number of the subframes in a cycle may be equal to the number of subframes in a frame. Preferably, the subframes marked as the first state in a cycle contain at least all the subframes from the subframe 0 to the subframe 5 or from the subframe 5 to the subframe 0.

In a further embodiment described with reference to FIG. 3 (also referred to as example 6), the base station may be based on the LTE TDD scheme. Each frame complies with the provision of the downlink\uplink frame structure configuration 0, 1 or 2. The number of the subframes in a cycle is 5. Preferably, in a cycle, the subframes marked as the first state must contain the subframe 5.

In the case of the example 4, for some allocation modes, the number of all the consecutive subframes marked as the second state between two subframes marked as the first state is larger. The corresponding time of these consecutive subframes forms the discontinuous time delay in the first communication. In a particular LTE TDD scheme system, depending upon the requirements of the LTE services or the needs of the operators, the time interval between 2 subframes having the control mapping relation may be specified, that is, the allowable upper limit of the time delay of the control mapping relation may be specified. In a further embodiment, according to the used allocation mode, the discontinuous time delay is no larger than the allowable upper limit of the time delay of the control mapping relation, the predetermined control mapping relation may include the control mapping relation between the subframe marked as the first state in the preceding cycle among the adjacent cycles and the subframe marked as the first state in the subsequent cycle (as described above with reference to FIG. 9(B)).

In the case of the example 4, based on a further embodiment, according to the used allocation mode, the discontinuous time delay is larger than the allowable upper limit of the time delay of the control mapping relation. In the embodiment, in the allocation mode the subframes marked as the first state are divided into two consecutive parts (as described above with reference to FIG. 10). Accordingly, the allowing in step 306 may include: in the subsequent part of the two consecutive parts, performing with the UE only the transmission that meets the control mapping relation involved in the transmission in the preceding part of the two consecutive parts.

It is to be noted that, though in some examples the invention is described with reference to the control mapping relation between the preceding downlink subframe and the following uplink subframe, those skilled will understand that the control mapping relation between the preceding uplink subframe and the following downlink subframe can be determined similarly.

In the case of the example 5 or 6, in a further embodiment, according to the predetermined control mapping relation, among the adjacent cycles, all subframes that have the control mapping relation with the subframes marked as the first state in the preceding cycle are contained in the subframes marked as the first state of the subsequent cycle. It is assumed that in each cycle the subframes marked as the first state contain n subframes, where the number of the uplink subframes is a and the number of the downlink subframes is b.

In the case of a>b, the first b−1 downlink subframes marked as the first state in the subsequent cycle respectively have control mapping relations with the ⌈a/b⌉ uplink subframes marked as the first state in the preceding cycle, the last downlink subframe marked as the first state in the subsequent cycle has a control mapping relation with the a−⌈a/b⌉·(b−1) uplink subframes marked as the first state in the preceding cycle, where ⌈a/b⌉ is larger than or equals to the minimum integer of the quotient obtained by dividing a by b. The order of the above downlink subframes is the same as the order of the sets of uplink subframes having control mapping relation to the downlink subframes.

In the case of a>b, the first b uplink subframes marked as the first state in the subsequent cycle respectively have control mapping relations with a downlink subframe marked as the first state in the preceding cycle. The order of the above uplink subframes is the same as the order of the downlink subframes having control mapping relation to the uplink subframes.

In the case of a=b, each downlink subframe marked as the first state in the subsequent cycle has control mapping relation with an uplink subframe marked as the first state in the preceding cycle, and each uplink subframe marked as the first state in the subsequent cycle has control mapping relation with a down link subframe marked as the first state in the preceding cycle. The order of the above uplink subframes is the same as the order of the downlink subframes having control mapping relation to the uplink subframes.

In the case of a<b, the first a−1 uplink subframes marked as the first state in the subsequent cycle respectively have control mapping relations with the ⌈b/a⌉ downlink subframes marked as the first state in the preceding cycle, the last uplink subframe marked as the first state in the subsequent cycle has the control mapping relation with the b−⌈b/a⌉·(a−1) downlink subframes marked as the first state in the preceding cycle, wherein ⌈b/a⌉ is the minimum integer of the quotient obtained by dividing a by b. The order of the above uplink subframes is the same as the order of the downlink subframes having control mapping relation to the uplink subframes.

In the case of a<b, the first a downlink subframes marked as the first state in the subsequent cycle each have control mapping relation with an uplink subframe marked as the first state in the preceding cycle. The order of the above downlink subframes is the same as the order of the uplink subframes having control mapping relation to the downlink subframes.

The control mapping relations described above with reference to FIGS. 11(A), 11(B), 13(A) and 13(B) are also applicable to the case of example 5. The control mapping relations described above with reference to FIGS. 12(A) and 12(B) are also applicable to the case of example 6.

In the LTE TDD system, the base station needs to broadcast system information to the UEs. The system information includes the master information block (MIB) and the system information block (SIB). MIB is generally broadcast in the subframe 0, and SIB is broadcast in the subframe 5. According to the system resource allocation, the system information may be borne on the subframe marked as the first state (for example the subframe 0 and the subframe 5), or the subframe marked as the second state may be used to purely transmit the system information.

Further, it is to be noted, the UE may perform the second communication with a plurality of peripheral devices during the time that the first communication is forbidden, especially the UE may perform the second communication based on different wireless communication schemes with the corresponding peripheral devices. In such cases, the UE may include a second transceiver for performing the second communication with the corresponding peripheral devices. The control device of the UE may allocate the corresponding time to the second transceiver for performing the second communication with the peripheral devices.

Figure 14:
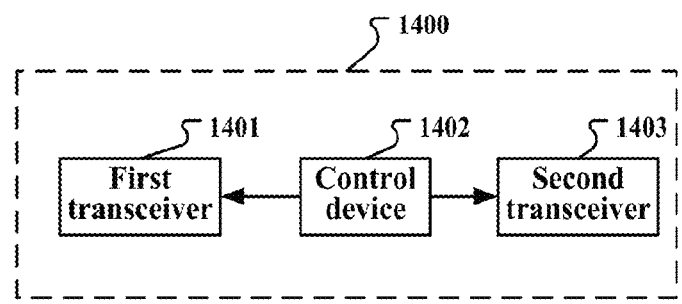
FIG. 14 is a schematic block diagram showing the structure of a UE according to an embodiment of the invention.

FIG. 14 is a schematic block diagram showing the structure of UE 1400 according to an embodiment of the invention. The UE 1400 may communicate with the base station based on the OFDM scheme in a time division duplex manner. The physical transmission resource used for the communication between the base station and the UE may be divided in time domain into a plurality of consecutive frames, each frame includes a plurality of subframes. The subframes are contained into the cycle formed of at least one subframe sequence. Each subframe subsequence complies with the same the same subframe distribution mode. The allocation mode as described above marks each subframe of each frame in the cycle as the first state or marked as the second state different from the first state, the subframes marked as the first state are consecutive and include at least one uplink subframe and at least one downlink subframe.

As shown in FIG. 14, the UE 1400 includes a first transceiver 1401, a control device 1402 and a second transceiver 1403.

The first transceiver 1401 may communicate with the base station, i.e. performs the first communication.

The second transceiver 1403 may perform other communication with at least one peripheral device according to other wireless communication schemes, i.e. the second communication.

The control device 1402 may control the first transceiver 1401 and the second transceiver 1403 according to the allocation mode. The control device 1402 controls, when determining that each subframe is marked as the first state, the first transceiver 1401 to perform the first communication on the subframe according to the predetermined control mapping relation related with the allocation mode, and in the case of determining that the subframe is marked as the second state and is not used by the UE to receive the system information, controls the second transceiver 1403 to perform the second communication during the time corresponding to the subframe with at least one peripheral device. For a certain subframe marked as the second state, the base station may broadcast the system information on the subframe. However, the UE may need not to receive the system information again on the subframe due to the system information already received successfully, therefore the UE may use the corresponding time of the subframe to perform the second communication.

In a further embodiment (hereinafter referred as example 7) of the method described with reference to FIG. 14, the base station may be based on the LTE TDD scheme. The number of the subframes of a cycle may be larger than the number of the subframes of a frame. The number of the subframes marked as the first state in the cycle is the integer multiples of the number of the subframes in the subframe sequence, i.e. the subframe distribution mode. Preferably, the allocation mode may be set such that, in every 4 frames the subframes marked as the first state contain at least 1 subframe 0, and in every 8 frames, the subframes marked as the first state contain at least 1 subframe 5 located in an even frame.

In a further embodiment (hereinafter referred as example 8) of the method described with reference to FIG. 14, the base station may be based on the LTE TDD scheme. The number of the subframes of a cycle may be equal to the number of the subframes of a frame. Preferably, the subframes marked as the first state in a cycle contain at least all the subframes from the subframe 0 to the subframe 5 or from the subframe 5 to the subframe 0.

In a further embodiment (hereinafter referred as example 9) of the method described with reference to FIG. 14, the base station may be based on the LTE TDD scheme. Each frame complies with the provision of the uplink\downlink frame structure configurations 0, 1 or 2. The number of the subframes of a cycle may be equal to 5. Preferably, the subframes marked as the first state in a cycle must contain the subframe 5.

In case of the example 7, for some allocation modes, the number of all the consecutive subframes marked as the second state between two subframes marked as the first state is larger. The corresponding time of these consecutive subframes forms the discontinuous time delay in the first communication. In a particular LTE TDD scheme system, depending upon the requirements of the LTE services or the needs of the operators, the time interval between 2 subframes having the control mapping relation may be specified, that is, the allowable upper limit of the time delay of the control mapping relation may be specified. In a further embodiment, according to the used allocation mode, the discontinuous time delay is no larger than the allowable upper limit of the time delay of the control mapping relation, the predetermined control mapping relation may include the control mapping relation between the subframe marked as the first state in the preceding cycle among the adjacent cycles and the subframe marked as the first state in the subsequent cycle (as described above with reference to FIG. 9(B)).

In the case of the example 7, based on a further embodiment, according to the used allocation mode, the discontinuous time delay is larger than the allowable upper limit of the time delay of the control mapping relation. In the embodiment, in the allocation mode the subframes marked as the first state are divided into two consecutive parts (as described above with reference to FIG. 10). Accordingly, the control device 1402 may be further configured such that, in the subsequent part of the two consecutive parts, perform only the transmission that meets the control mapping relation involved in the transmission in the preceding part of the two consecutive parts.

It is to be noted that, though in some examples the invention is described with reference to the control mapping relation between the preceding downlink subframe and the following uplink subframe, those skilled will understand that the control mapping relation between the preceding uplink subframe and the following downlink subframe can be determined similarly.

In the case of the example 8 or 9, in a further embodiment, according to the predetermined control mapping relation, among the adjacent cycles, all subframes that have the control mapping relation with the subframes marked as the first state in the preceding cycle are contained in the subframes marked as the first state of the subsequent cycle. It is assumed that in each cycle the subframes marked as the first state contain n subframes, where the number of the uplink subframes is a and the number of the downlink subframes is b.

In the case of a>b, the first b−1 downlink subframes marked as the first state in the subsequent cycle respectively have control mapping relations with the $\lceil a/b \rceil$ uplink subframes marked as the first state in the preceding cycle, the last downlink subframe marked as the first state in the subsequent cycle has a control mapping relation with the $a-\lceil a/b \rceil \cdot (b-1)$ uplink subframes marked as the first state in the preceding cycle, where $\lceil a/b \rceil$ is larger than or equals to the minimum integer of the quotient obtained by dividing a by b. The order of the above downlink subframes is the same as the order of the sets of uplink subframes having control mapping relation to the downlink subframes.

In the case of a>b, the first b uplink subframes marked as the first state in the subsequent cycle respectively have control mapping relations with a downlink subframe marked as the first state in the preceding cycle. The order of the above uplink subframes is the same as the order of the downlink subframes having control mapping relation to the uplink subframes.

In the case of a=b, each downlink subframe marked as the first state in the subsequent cycle has control mapping relation with an uplink subframe marked as the first state in the preceding cycle, and each uplink subframe marked as the first state in the subsequent cycle has control mapping relation with a down link subframe marked as the first state in the preceding cycle. The order of the above uplink subframes is the same as the order of the downlink subframes having control mapping relation to the uplink subframes.

In the case of a<b, the first a−1 uplink subframes marked as the first state in the subsequent cycle respectively have control mapping relations with the $\lceil b/a \rceil$ downlink subframes marked as the first state in the preceding cycle, the last uplink subframe marked as the first state in the subsequent cycle has the control mapping relation with the $b-\lceil b/a \rceil \cdot (a-1)$ downlink subframes marked as the first state in the preceding cycle, wherein $\lceil b/a \rceil$ is the minimum integer of the quotient obtained by dividing a by b. The order of the above uplink subframes is the same as the order of the downlink subframes having control mapping relation to the uplink subframes.

In the case of a<b, the first a downlink subframes marked as the first state in the subsequent cycle each have control mapping relation with an uplink subframe marked as the first state in the preceding cycle. The order of the above downlink subframes is the same as the order of the uplink subframes having control mapping relation to the downlink subframes.

The control mapping relations described above with reference to FIGS. 11(A), 11(B), 13(A) and 13(B) may be applicable to the case of example 8 and the control mapping relation described above with reference to FIGS. 12(A) and 12(B) may be applicable to the case of example 9.

Figure 15:
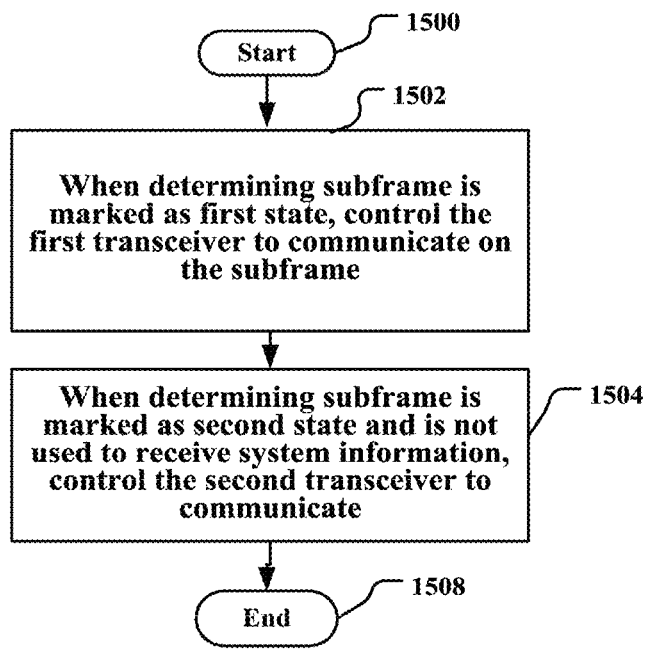
FIG. 15 is a schematic flow chart showing the process of a method of communication control in a UE according to an embodiment of the invention.

FIG. 15 is a schematic flow chart showing the process of a method of performing communication control in an UE according to an embodiment of the invention. The UE may communicate with the base station based on the OFDM scheme in a time division duplex manner. The physical transmission resource used for the communication between the base station and the UE may be divided in time domain into a plurality of consecutive frames, each frame includes a plurality of subframes. The subframes are contained into the cycle formed of at least one subframe sequence. Each subframe subsequence complies with the same the same subframe distribution mode. The allocation mode as described above marks each subframe of each frame in the cycle as the first state or marked as the second state different from the first state, the subframes marked as the first state are consecutive and include at least one uplink subframe and at least one downlink subframe.

As shown in FIG. 15, the method starts at step 1500. In step 1502, in the case of determining that each subframe is marked as the first state, control is performed to communicate with the base station, i.e. the first transceiver for the first communication performs the first communication on the subframe according to the predetermined control mapping relation related to the allocation mode.

In step 1504, in the case of determining that the subframe is marked as the second state and is not used by the UE to receive the system information, control is performed to perform other communication with at least one peripheral device according to other wireless communication scheme, i.e. the second transceiver for the second communication communicates with the at least one peripheral device during the corresponding time of the subframe, that is, performs the second communication. For a subframe marked as the second state, the base station may broadcast the system information on the subframe. However, the UE may need not to receive the system information again on the subframe due to the system information already received successfully, therefore the UE may use the corresponding time of the subframe to perform the second communication.

Then the method ends in step 1506.

In a further embodiment described with reference to FIG. 15 (also referred to as example 10), the base station may be based on the LTE TDD scheme. The number of the subframes in a cycle may be larger than the number of subframes in a frame. The number of the subframes marked as the first state in a cycle is the integer multiples of the number of subframes of the subframe distribution mode, i.e. the subframe sequence. Preferably, the allocation mode may be set such that in every 4 frames, the subframes marked as the first state contain at least one subframe 0, and in every 8 frames, the subframes marked as the first state contain at least one subframe 5 in the even frames.

In a further embodiment described with reference to FIG. 15 (also referred to as example 11), the base station may be based on the LTE TDD scheme. The number of the subframes in a cycle may be equal to the number of subframes in a frame. Preferably, the subframes marked as the first state in a cycle contain at least all the subframes from the subframe 0 to the subframe 5 or from the subframe 5 to the subframe 0.

In a further embodiment described with reference to FIG. 15 (also referred to as example 12), the base station may be based on the LTE TDD scheme. Each frame complies with the provision of the downlink\uplink frame structure configuration 0, 1 or 2. The number of the subframes in a cycle is 5. Preferably, in a cycle, the subframes marked as the first state must contain the subframe 5.

In the case of the example 10, for some allocation modes, the number of all the consecutive subframes marked as the second state between two subframes marked as the first state is larger. The corresponding time of these consecutive subframes forms the discontinuous time delay in the first communication. In a particular LTE TDD scheme system, depending upon the requirements of the LTE services or the needs of the operators, the time interval between 2 subframes having the control mapping relation may be specified, that is, the allowable upper limit of the time delay of the control mapping relation may be specified. In a further embodiment, according to the used allocation mode, the discontinuous time delay is no larger than the allowable upper limit of the time delay of the control mapping relation, the predetermined control mapping relation may include the control mapping relation between the subframe marked as the first state in the preceding cycle among the adjacent cycles and the subframe marked as the first state in the subsequent cycle (as described above with reference to FIG. 9(B)).

In the case of the example 10, based on a further embodiment, according to the used allocation mode, the discontinuous time delay is larger than the allowable upper limit of the time delay of the control mapping relation. In the embodiment, in the allocation mode the subframes marked as the first state are divided into two consecutive parts (as described above with reference to FIG. 10). Accordingly, the control in step 1503 may include: in the subsequent part of the two consecutive parts, performing only the transmission that meets the control mapping relation involved in the transmission in the preceding part of the two consecutive parts.

It is to be noted that, though in some examples the invention is described with reference to the control mapping relation between the preceding downlink subframe and the following uplink subframe, those skilled will understand that the control mapping relation between the preceding uplink subframe and the following downlink subframe can be determined similarly.

In the case of the example 11 or 12, in a further embodiment, according to the predetermined control mapping relation, among the adjacent cycles, all subframes that have the control mapping relation with the subframes marked as the first state in the preceding cycle are contained in the subframes marked as the first state of the subsequent cycle. It is assumed that in each cycle the subframes marked as the first state contain n subframes, where the number of the uplink subframes is a and the number of the downlink subframes is b.

In the case of a>b, the first b−1 downlink subframes marked as the first state in the subsequent cycle respectively have control mapping relations with the $\lceil a/b \rceil$ uplink subframes marked as the first state in the preceding cycle, the last downlink subframe marked as the first state in the subsequent cycle has a control mapping relation with the $a - \lceil a/b \rceil \cdot (b-1)$ uplink subframes marked as the first state in the preceding cycle, where $\lceil a/b \rceil$ is larger than or equals to the minimum integer of the quotient obtained by dividing a by b. The order of the above downlink subframes is the same as the order of the sets of uplink subframes having control mapping relation to the downlink subframes.

In the case of a>b, the first b uplink subframes marked as the first state in the subsequent cycle respectively have control mapping relations with a downlink subframe marked as the first state in the preceding cycle. The order of the above uplink subframes is the same as the order of the downlink subframes having control mapping relation to the uplink subframes.

In the case of a=b, each downlink subframe marked as the first state in the subsequent cycle has control mapping relation with an uplink subframe marked as the first state in the preceding cycle, and each uplink subframe marked as the first state in the subsequent cycle has control mapping relation with a down link subframe marked as the first state in the preceding cycle. The order of the above uplink subframes is the same as the order of the downlink subframes having control mapping relation to the uplink subframes.

In the case of a<b, the first a−1 uplink subframes marked as the first state in the subsequent cycle respectively have control mapping relations with the $\lceil b/a \rceil$ downlink subframes marked as the first state in the preceding cycle, the last uplink subframe marked as the first state in the subsequent cycle has the control mapping relation with the b−⌈b/a⌉·(a−1) downlink subframes marked as the first state in the preceding cycle, wherein ⌈b/a⌉ is the minimum integer of the quotient obtained by dividing a by b. The order of the above uplink subframes is the same as the order of the downlink subframes having control mapping relation to the uplink subframes.

In the case of a<b, the first a downlink subframes marked as the first state in the subsequent cycle each have control mapping relation with an uplink subframe marked as the first state in the preceding cycle. The order of the above downlink subframes is the same as the order of the uplink subframes having control mapping relation to the downlink subframes.

The control mapping relations described above with reference to FIGS. 11(A), 11(B), 13(A) and 13(B) are also applicable to the case of example 5. The control mapping relations described above with reference to FIGS. 12(A) and 12(B) are also applicable to the case of example 6.

In a particular implementation, the embodiments of the invention may be realized by extending and considering the discontinuous receiving (DRX) mode. In normal DRX mode, the subframe stream is divided into cycles. Each cycle is divided into a preceding first part and a subsequent second part. The UE performs detection of physical downlink control cannel (PDCCH) in the corresponding time of the first part, and does not perform the PDCCH detection in the corresponding time of the second part.

An extended DRX mode may be realized by extending the normal DRX mode, wherein the subframe part marked as the first state of the allocation mode is used as the first part, and the subframe part marked as the second state is used as the second part. In the extended DRX mode, the control device of the UE may be configured to forbid the first transceiver of the UE to receive or transmit any information or data during the corresponding time of the second part.

Further, switching between the short DRX cycle mode and the long DRX cycle mode, the communication control device of the base station may determine that the shortDRXCycle option is available in response to the activating of the extended DRX mode. If available, the shortDRXCycle option and the longDRXCycle option both are configured as equal length, or the shortDRXCycle option may be disabled.

Further, to avoid the operations such as the automatic triggering or restart of the extended DRX mode, the communication control device of the base station may disable the drx-RetransmissionTimer option and the drx-InactivityTimer option in response to the activating of the extended DRX mode.

Further, the base station may set, in response to the activating of the extended DRX mode, such that the UE is capable of recognizing the activating of the extended DRX mode. Particularly, the parameter drx-Mode:(0,1) may be added in DRX-Config::setup, where when drx-Mode=0, it is the normal DRX mode; and when drx-Mode=1, it is the co-existing DRX mode.

The establishing of the normal DRX mode is triggered by the base station, while the extended DRX mode is triggered by the UE. The trigger by be performed by transmitting a specified request message from the UE to the base station. The request message may be transmitted in the form of MAC command. For example, a new MAC control element, CoEX-DRXMAC CE, may be defined, wherein a new LCID value, e.g. 01011, is defined for the CoEX-DRX MAC CE. The request message may be transmitted in the form of RRC command. For example, the form of RRC_CoEX_DRX_Establishment_Request:Mode: (mode1, mode2, mode3, . . . , mode N) may be used.

The parameters of the extended DRX mode may be configured by the following DRX parameters:

The cycle of the co-existing mode and the offset of the cycle: the parameter longDRX-CycleStartOffset (cycle, offset), The LTE operation time in co-existing cycle: the parameter onDurationTimer.

It should be noted that,

1. Here, restricted by the parameter longDRX-CycleStartOffse, the cycle may be 10, 20, 40, 80, 160, 320, 640, 1280 or 2560 ms.

2. The parameter onDurationTimer is counted in the unit of the downlink subframe.

Those skilled in the art can appreciate, the devices and steps in the embodiments of the invention may be embodied as for example a system, a method or a computer program product. Thus, the invention may be realized by the following forms, i.e. totally hardware, totally software (including firmware, resident software, micro codes, or the like), or the combination of software part and hardware part called as "circuit", "module" or "system". Further, the invention may be realized by computer program product in any tangible medium of expression, the medium contains program codes usable by a computer.

Any combination of one or more computer readable mediums can be used. The computer readable medium may be computer readable signal medium or computer readable storage medium. For example, the computer readable medium may be, but not limited to, electric, magnetic, optical, electro-magnetic, infrared, or semiconductor system, apparatus, device or propagation medium, or any combination thereof. The particular examples of the computer readable storage medium include the following (which is not an exhausted list): electrical connection with one or more conductors, portable computer disc, hard disk, random access memory (RAM), read only memory (ROM), erasable programmable read only memory (EPROM or flash memory), fiber, portable compact disc-read only memory (CD-ROM), optical storage device, magnetic storage device, or any combination thereof. In the context, the computer readable storage medium may be any tangible medium that contains or stores the program to be used by, or related to, an instruction executing system, apparatus, or device.

The computer readable signal medium may include, for example, a data signal carrying computer readable program codes to be propagated in base band or as a part of a carrier. Such a propagation signal may assume any appropriate form including, but not limited to, electro-magnetic or optical form or any combination thereof. The computer readable signal medium may be any type of computer readable medium that is different from the computer readable storage medium and may transfer, propagate or transmit the program to be used by, or related to, an instruction executing system, apparatus, or device. The program codes contained in the computer readable medium may be transmitted by any appropriate medium including, but not limited to, wireless, wired, optical fiber, or radio frequency form or the like, or any combination thereof.

The computer program codes for realizing the invention may be written with any combination of one or more program design languages. The program design languages include object oriented program design languages, such as Java, Smalltalk, C++ or the like, and further include conventional procedural program design languages, such as "C" program design language or the like. The program codes may be executed, as an independent software packet, fully on the user's computer or executed in part on the user's computer; or executed in part on the user's computer and in part on a remote computer, or executed fully on a remote computer or server. In the latter case, the remote computer may be connected to the user's computer via any type of networks including, but not limited to, local area network (LAN) or wide area network (WAN), or may be connected to an external computer via for example the internet through the internet service provider.

Figure 16:
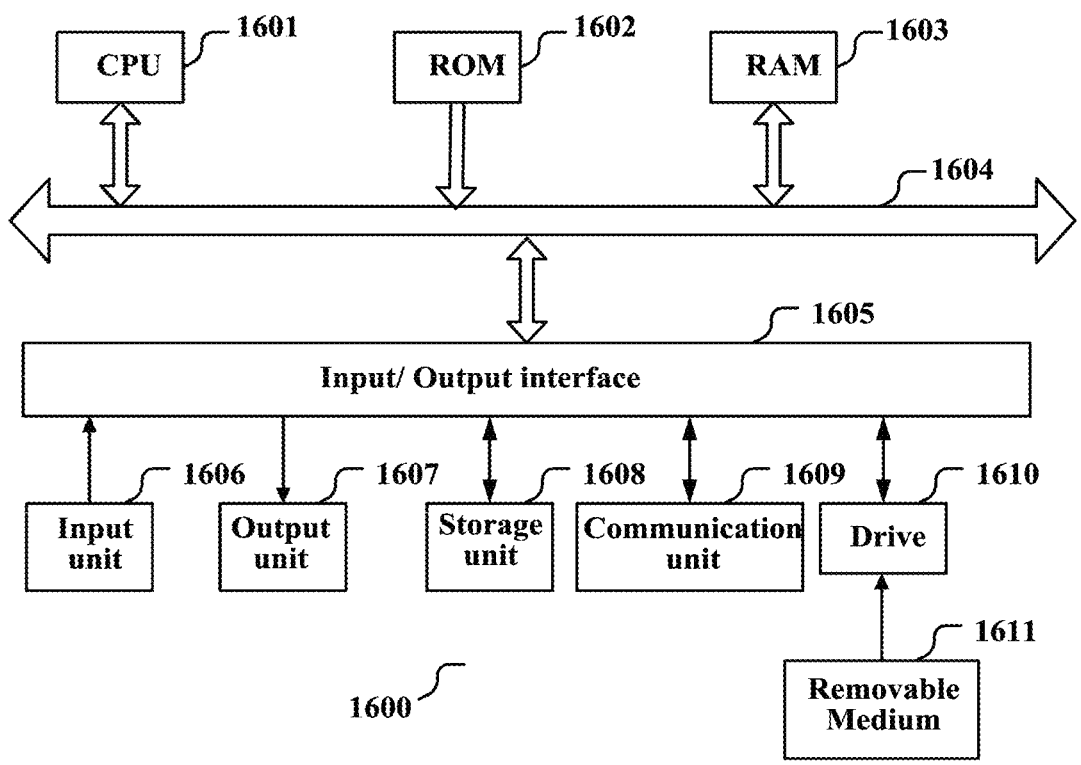
FIG. 16 is a schematic block diagram showing the structure of a computer by which the devices and methods according to the invention can be realized.

FIG. 16 is a schematic block diagram showing the structure of a computer for realizing the apparatus or method of the invention.

In FIG. 16, the central processing unit (CPU) 1601 performs various processing according to the program stored in ROM 1602 or the program loaded from the storage unit 1608 to RAM 1603. RAM 1603 also stores the data for performing various processing by CPU 1601 as required.

CPU 1601, ROM 1602 and RAM 1603 are connected with each other via the bus 1604. Input\output interface 1605 is also connected to the bus 1604.

The following components are connected to the input\output interface 1605: the input unit 1606, including keyboard, mouse or the like; the output unit 1607, including a display such as Cathode-ray tube (CRT), liquid crystal display (LCD), or the like, and a speaker and the like; the storage unit 1608, including hard disc or the like; and the communication unit 1609, including a network interface card such as LAN card, or a modem or the like. The communication unit 1609 performs communication via network, such as internet.

As required, the drive 1610 may also be connected to the input\output interface 1605. The removable medium 1611, such as magnetic disc, optical disc, magnetic-optical disc, or semiconductor mapping data, or the like, may be installed on the drive 1610 as required, such that the computer program read therefrom can be loaded into the storage unit 1608 as required.

In the case that the above steps and processes are realized by software, the program constituting the software is installed from the network, such as internet, or from the storage medium, such as the removable medium 1611.

Those skilled in the art can appreciate, such storage medium is not limited to the removable medium 1611 which stores program and distribute the program to the users separately from the method as shown in FIG. 16. Examples of the removable medium 1611 contain magnetic disc, optical disc (containing compact disc-read only memory and digital versatile disc (DVD)), magnetic-optical disc (containing minidisc (MD) and semiconductor mapping data). Or, the storage medium may be ROM 1602, the hard disc contained in the storage unit 1608, or the like, in which program is stored and is distributed to the users together with their method.

The corresponding structures, materials, operations and all the functionally defined means or steps in the following claims and the equivalent thereof is intended to include any structure, material, or operation for performing the function in combination with other units particularly specified in the claims. The description of the invention aims to illustrate and clarify the invention, and is not exhaustive, nor to limit the invention in the described form. To those skilled in the art, many modifications and variations are apparent without departing from the scope and spirit of the invention. The choice and description of the embodiments are to better interpret the principle and practical application of the invention, so that those skilled in the art can better understand that the invention can encompass various embodiments with various changes suitable for desired special purposes.

The invention claimed is:

1. A base station for communicating with a user equipment in a time division duplex manner based on an orthogonal frequency division multiplexing scheme, wherein physical transmission resources for the communication between the base station and the user equipment are divided into a plurality of consecutive frames in the time domain, each of the frames comprises a plurality of subframes, and the base station comprises:

a cycle determination device which determines a cycle to which each subframe belongs, wherein the cycle consists of at least one subframe sequence, each of which complies with the same subframe distribution pattern;

a judgment device which determines whether each subframe of each cycle is marked as a first state or a second state different from the first state according to an allocation pattern, wherein the allocation pattern marks each subframe of the cycle as the first state or the second state, the subframes marked as the first state are consecutive, and include at least one uplink subframe and at least one downlink subframe; and a communication control device which, in case of determining that the subframe is marked as the first state, enables the base station to communicate with the user equipment over the subframe according to a predetermined control mapping relation associated with the allocation pattern, and in case of determining that the subframe is marked as the second state, disables the base station from performing the communication relating to the user equipment over the subframe, wherein the base station complies with the Long Term Evolution-Time Division Duplex scheme, the number of subframes in the cycle being greater than that of subframes in one frame, and the number of subframes marked as the first state in the cycle being an integer multiple of that of subframes in the subframe sequence.

2. The base station according to claim 1, wherein in case that a duration corresponding to all the consecutive subframes marked as the second state between two subframes marked as the first state is not greater than a latency upper limit prescribed for the control mapping relation, the predetermined control mapping relation comprises control mapping relation between a subframe marked as the first state in former one of adjacent cycles and another subframe marked as the first state in latter one of the adjacent cycles.

3. The base station according to claim 1, wherein in case that a duration corresponding to all the consecutive subframes marked as the second state between two subframes marked as the first state is greater than a latency upper limit prescribed for the control mapping relation, in the allocation pattern, subframes marked as the first state are divided into two consecutive portions, the communication control device is further configured to only perform transmission required for satisfying the control mapping relation involved in the transmission on the former portion of the two consecutive portions, on the latter portion of the two consecutive portions.

4. The base station according to claim 1, wherein the base station complies with the Long Term Evolution-Time Division Duplex scheme, the number of subframes in the cycle is equal to that of subframes in one frame.

5. The base station according to claim 4, wherein according to the predetermined control mapping relation, in adjacent cycles, all the subframes involving control mapping relation with subframes marked as the first state in the former cycle are included in subframes marked as the first state in the latter cycle, assuming that subframes marked as the first state in each cycle include n subframes, wherein the number of uplink subframes is a, and the number of downlink subframes is b, then in case of a>b, first b−1 downlink subframes marked as the first state in the latter cycle have control mapping relation respectively with ⌈a/b⌉ uplink subframes marked as the first state in the former cycle, and the last one downlink subframe marked as the first state in the latter cycle has control mapping relation with a−⌈a/b⌉·(b−1) uplink subframes marked as the first state in the former cycle, wherein ⌈a/b⌉ represents a minimum integer greater than or equal to the quotient obtained by dividing a by b, the order of the respective downlink subframes is identical to that of the respective groups of uplink subframes having control mapping relation with the respective downlink subframes, first b uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a=b, respective downlink subframes marked as the first state in the latter cycle have control mapping relation respectively with one uplink subframe marked as the first state in the former cycle, respective uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a<b, first a−1 uplink subframes marked as the first state in the latter cycle have control mapping relation respectively with ⌈b/a⌉ downlink subframes marked as the first state in the former cycle, and the last one uplink subframe marked as the first state in the latter cycle has control mapping relation with b−⌈b/a⌉·(a−1) downlink subframes marked as the first state in the former cycle, wherein ⌈b/a⌉ represents a minimum integer greater than or equal to the quotient obtained by dividing b by a, the order of the respective uplink subframes is identical to that of the respective groups of downlink subframes having control mapping relation with the respective uplink subframes, first a downlink subframes marked as the first state in the latter cycle have control mapping relation respectively with one uplink subframe marked as the first state in the former cycle, and the order of the respective downlink subframes is identical to that of the respective uplink subframes having control mapping relation with the respective downlink subframes.

6. The base station according to claim 1, wherein the base station complies with the Long Term Evolution-Time Division Duplex scheme, each frame complies with uplink ¥ downlink frame structure configuration 0, 1 or 2, and the number of subframes in the cycle is equal to 5.

7. A user equipment for communicating with a base station in a time division duplex manner based on an orthogonal frequency division multiplexing scheme, wherein physical transmission resources for the communication between the base station and the user equipment are divided into a plurality of consecutive frames in the time domain, each of the frames comprising a plurality of subframes, the user equipment comprising:

a first transceiver for the communication with the base station;

a second transceiver for another communication with at least one peripheral device based on another wireless communication scheme; and a control device which controls the first transceiver and the second transceiver according to an allocation pattern, wherein respective subframes are divided into cycles consisting of at least one subframe sequence, each of which complies with the same subframe distribution pattern, the allocation pattern marks each subframe of the cycles as a first state or a second state different from the first state, and the subframes marked as the first state are consecutive and include at least one uplink subframe and at least one downlink subframe, the control device controlling the first transceiver to communicate with the base station over each subframe according to a predetermined control mapping relation associated with the allocation pattern in case of determining that the subframe is marked as the first state, and controls the second transceiver to perform the other communication in time corresponding to each subframe in case of determining that the subframe is marked as the second state and is not used by the user equipment for receiving system information, wherein the user equipment complies with the Long Term Evolution-Time Division Duplex scheme, the number of subframes in the cycle being greater than that of subframes in one frame, and the number of subframes marked as the first state in the cycle being an integer multiple of that of subframes in the subframe sequence.

8. The user equipment according to claim 7, wherein in case that a duration corresponding to all the consecutive subframes marked as the second state between two subframes marked as the first state is not greater than a latency upper limit prescribed for the control mapping relation, the predetermined control mapping relation comprises control mapping relation between a subframe marked as the first state in former one of adjacent cycles and another subframe marked as the first state in latter one of the adjacent cycles.

9. The user equipment according to claim 7, wherein in case that a duration corresponding to all the consecutive subframes marked as the second state between two subframes marked as the first state is greater than a latency upper limit prescribed for the control mapping relation, in the allocation pattern, subframes marked as the first state are divided into two consecutive portions, the control device is further configured to only perform transmission required for satisfying the control mapping relation involved in the transmission on the former portion of the two consecutive portions, on the latter portion of the two consecutive portions.

10. The user equipment according to claim 7, wherein the user equipment complies with the Long Term Evolution-Time Division Duplex scheme, the number of subframes in the cycle is equal to that of subframes in one frame.

11. The user equipment according to claim 10, wherein according to the predetermined control mapping relation, in adjacent cycles, all the subframes involving control mapping relation with subframes marked as the first state in the former cycle are included in subframes marked as the first state in the latter cycle, assuming that subframes marked as the first state in each cycle include n subframes, wherein the number of uplink subframes is a, and the number of downlink subframes is b, then in case of a>b, first b−1 downlink subframes marked as the first state in the latter cycle have control mapping relation respectively with ⌈a/b⌉ uplink subframes marked as the first state in the former cycle, and the last one downlink subframe marked as the first state in the latter cycle has control mapping relation with a−⌈a/b⌉·(b−1) uplink subframes marked as the first state in the former cycle, wherein ⌈a/b⌉ represents a minimum integer greater than or equal to the quotient obtained by dividing a by b, the order of the respective downlink subframes is identical to that of the respective groups of uplink subframes having control mapping relation with the respective downlink subframes, first b uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a=b, respective downlink subframes marked as the first state in the latter cycle have control mapping relation respectively with one uplink subframe marked as the first state in the former cycle, respective uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a<b, first a−1 uplink subframes marked as the first state in the latter cycle have control mapping relation respectively with ⌈b/a⌉ downlink subframes marked as the first state in the former cycle, and the last one uplink subframe marked as the first state in the latter cycle has control mapping relation with b−⌈b/a⌉~(a−1) downlink subframes marked as the first state in the former cycle, wherein ⌈b/a⌉ represents a minimum integer greater than or equal to the quotient obtained by dividing b by a, the order of the respective uplink subframes is identical to that of the respective groups of downlink subframes having control mapping relation with the respective uplink subframes, first a downlink subframes marked as the first state in the latter cycle have control mapping relation respectively with one uplink subframe marked as the first state in the former cycle, and the order of the respective downlink subframes is identical to that of the respective uplink subframes having control mapping relation with the respective downlink subframes.

12. The user equipment according to claim 7, wherein the user equipment complies with the Long Term Evolution-Time Division Duplex scheme, each frame complies with uplink ¥ downlink frame structure configuration 0, 1 or 2, and the number of subframes in the cycle is equal to 5.

13. A method of communication resource allocation in a base station for communicating with a user equipment in a time division duplex manner based on an orthogonal frequency division multiplexing scheme, wherein physical transmission resources for the communication between the base station and the user equipment are divided into a plurality of consecutive frames in the time domain, each of the frames comprising a plurality of subframes, the method comprising:

determining a cycle to which each subframe belongs, wherein the cycle consists of at least one subframe sequence, each of which complies with the same subframe distribution pattern;

determining whether each subframe of each cycle is marked as a first state or a second state different from the first state according to an allocation pattern, wherein the allocation pattern marks each subframe of the cycle as the first state or the second state, the subframes marked as the first state being consecutive, and include at least one uplink subframe and at least one downlink subframe; and in case of determining that the subframe is marked as the first state, enabling the base station to communicate with the user equipment over the subframe according to a predetermined control mapping relation associated with the allocation pattern, and in case of determining that the subframe is marked as the second state, disabling the base station from performing the communication relating to the user equipment over the subframe, wherein the base station complies with the Long Term Evolution-Time Division Duplex scheme, the number of subframes in the cycle being greater than that of subframes in one frame, and the number of subframes marked as the first state in the cycle being an integer multiple of that of subframes in the subframe sequence.

14. The method according to claim 13, wherein in case that a duration corresponding to all the consecutive subframes marked as the second state between two subframes marked as the first state is not greater than a latency upper limit prescribed for the control mapping relation, the predetermined control mapping relation comprises control mapping relation between a subframe marked as the first state in former one of adjacent cycles and another subframe marked as the first state in latter one of the adjacent cycles.

15. The method according to claim 13, wherein in case that a duration corresponding to all the consecutive subframes marked as the second state between two subframes marked as the first state is greater than a latency upper limit prescribed for the control mapping relation, in the allocation pattern, subframes marked as the first state are divided into two consecutive portions, the enabling comprises only performing transmission required for satisfying the control mapping relation involved in the transmission on the former portion of the two consecutive portions, on the latter portion of the two consecutive portions.

16. The method according to claim 13, wherein the base station complies with the Long Term Evolution-Time Division Duplex scheme, the number of subframes in the cycle is equal to that of subframes in one frame.

17. The method according to claim 16, wherein according to the predetermined control mapping relation, in adjacent cycles, all the subframes involving control mapping relation with subframes marked as the first state in the former cycle are included in subframes marked as the first state in the latter cycle, assuming that subframes marked as the first state in each cycle include n subframes, wherein the number of uplink subframes is a, and the number of downlink subframes is b, then in case of a>b, first b−1 downlink subframes marked as the first state in the latter cycle have control mapping relation respectively with ⌈a/b⌉ uplink subframes marked as the first state in the former cycle, and the last one downlink subframe marked as the first state in the latter cycle has control mapping relation with a−⌈a/b⌉·(b−1) uplink subframes marked as the first state in the former cycle, wherein ⌈a/b⌉ represents a minimum integer greater than or equal to the quotient obtained by dividing a by b, the order of the respective downlink subframes is identical to that of the respective groups of uplink subframes having control mapping relation with the respective downlink subframes, first b uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a=b, respective downlink subframes marked as the first state in the latter cycle have control mapping relation respectively with one uplink subframe marked as the first state in the former cycle, respective uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a<b, first a−1 uplink subframes marked as the first state in the latter cycle have control mapping relation respectively with ⌈b/a⌉ downlink subframes marked as the first state in the former cycle, and the last one uplink subframe marked as the first state in the latter cycle has control mapping relation with b−⌈b/a⌉·(a−1) downlink subframes marked as the first state in the former cycle, wherein ⌈b/a⌉ represents a minimum integer greater than or equal to the quotient obtained by dividing b by a, the order of the respective uplink subframes is identical to that of the respective groups of downlink subframes having control mapping relation with the respective uplink subframes, first a downlink subframes marked as the first state in the latter cycle have control mapping relation respectively with one uplink subframe marked as the first state in the former cycle, and the order of the respective downlink subframes is identical to that of the respective uplink subframes having control mapping relation with the respective downlink subframes.

18. The method according to claim 13, wherein the base station complies with the Long Term Evolution-Time Division Duplex scheme, each frame complies with uplink ¥ downlink frame structure configuration 0, 1 or 2, and the number of subframes in the cycle is equal to 5.

19. A method of communication control in a user equipment for communicating with a base station in a time division duplex manner based on an orthogonal frequency division multiplexing scheme, wherein physical transmission resources for the communication with the base station are divided into a plurality of consecutive frames in the time domain, each of the frames comprising a plurality of subframes, the method comprising:

controlling a first transceiver for the communication with the base station and a second transceiver for another communication with at least one peripheral device based on another wireless communication scheme, according to an allocation pattern, wherein respective subframes are divided into cycles consisting of at least one subframe sequence, each of which complies with the same subframe distribution pattern, the allocation pattern marks each subframe of the cycles as a first state or a second state different from the first state, and the subframes marked as the first state are consecutive and include at least one uplink subframe and at least one downlink subframe, wherein the control comprises controlling the first transceiver to communicate with the base station over each subframe according to a predetermined control mapping relation associated with the allocation pattern in case of determining that the subframe is marked as the first state, and controlling the second transceiver to perform the other communication in time corresponding to each subframe in case of determining that the subframe is marked as the second state and is not used by the user equipment for receiving system information, wherein the user equipment complies with the Long Term Evolution-Time Division Duplex scheme, the number of subframes in the cycle being greater than that of subframes in one frame, and the number of subframes marked as the first state in the cycle being an integer multiple of that of subframes in the subframe sequence.

20. The method according to claim 19, wherein in case that a duration corresponding to all the consecutive subframes marked as the second state between two subframes marked as the first state is not greater than a latency upper limit prescribed for the control mapping relation, the predetermined control mapping relation comprises control mapping relation between a subframe marked as the first state in former one of adjacent cycles and another subframe marked as the first state in latter one of the adjacent cycles.

21. The method according to claim 19, wherein in case that a duration corresponding to all the consecutive subframes marked as the second state between two subframes marked as the first state is greater than a latency upper limit prescribed for the control mapping relation, in the allocation pattern, subframes marked as the first state are divided into two consecutive portions, the controlling comprises only performing transmission required for satisfying the control mapping relation involved in the transmission on the former portion of the two consecutive portions, on the latter portion of the two consecutive portions.

22. The method according to claim 19, wherein the user equipment complies with the Long Term Evolution-Time Division Duplex scheme, the number of subframes in the cycle is equal to that of subframes in one frame.

23. The method according to claim 22, wherein according to the predetermined control mapping relation, in adjacent cycles, all the subframes involving control mapping relation with subframes marked as the first state in the former cycle are included in subframes marked as the first state in the latter cycle, assuming that subframes marked as the first state in each cycle include n subframes, wherein the number of uplink subframes is a, and the number of downlink subframes is b, then in case of a>b, first b−1 downlink subframes marked as the first state in the latter cycle have control mapping relation respectively with ⌈a/b⌉ uplink subframes marked as the first state in the former cycle, and the last one downlink subframe marked as the first state in the latter cycle has control mapping relation with a−⌈a/b⌉·(b−1) uplink subframes marked as the first state in the former cycle, wherein ⌈a/b⌉ represents a minimum integer greater than or equal to the quotient obtained by dividing a by b, the order of the respective downlink subframes is identical to that of the respective groups of uplink subframes having control mapping relation with the respective downlink subframes, first b uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a=b, respective downlink subframes marked as the first state in the latter cycle have control mapping relation respectively with one uplink subframe marked as the first state in the former cycle, respective uplink subframes marked as the first state in the latter cycle have control mapping relation respectively with one downlink subframe marked as the first state in the former cycle, and the order of the respective uplink subframes is identical to that of the respective downlink subframes having control mapping relation with the respective uplink subframes, in case of a<b, first a−1 uplink subframes marked as the first state in the latter cycle have control mapping relation respectively with ⌈b/a⌉ downlink subframes marked as the first state in the former cycle, and the last one uplink subframe marked as the first state in the latter cycle has control mapping relation with b−⌈b/a⌉·(a−1) downlink subframes marked as the first state in the former cycle, wherein ⌈b/a⌉ represents a minimum integer greater than or equal to the quotient obtained by dividing b by a, the order of the respective uplink subframes is identical to that of the respective groups of downlink subframes having control mapping relation with the respective uplink subframes, first a downlink subframes marked as the first state in the latter cycle have control mapping relation respectively with one uplink subframe marked as the first state in the former cycle, and the order of the respective downlink subframes is identical to that of the respective uplink subframes having control mapping relation with the respective downlink subframes.

24. The method according to claim 19, wherein the user equipment complies with the Long Term Evolution-Time Division Duplex scheme, each frame complies with uplink ¥ downlink frame structure configuration 0, 1 or 2, and the number of subframes in the cycle is equal to 5.

* * * * *